United States Patent [19]

Williams

[11] 4,251,762
[45] Feb. 17, 1981

[54] ARMATURE POSITION DETECTOR

[75] Inventor: Leonard J. Williams, East Aurora, N.Y.

[73] Assignee: Moog Inc., East Aurora, N.Y.

[21] Appl. No.: 20,951

[22] Filed: Mar. 16, 1979

[51] Int. Cl.$^3$ ............................................. G05B 1/06
[52] U.S. Cl. ................................... 318/653; 318/689; 137/596.17
[58] Field of Search ............... 318/653, 689; 137/85, 137/596.17

[56] References Cited

U.S. PATENT DOCUMENTS

| | | | |
|---|---|---|---|
| 2,980,837 | 4/1961 | Wu | 318/653 |
| 3,668,502 | 6/1972 | Pilger | 318/653 |
| 4,017,858 | 4/1977 | Kuipers | 318/653 X |
| 4,019,131 | 4/1977 | Yamada et al. | 318/653 X |

Primary Examiner—B. Dobeck
Attorney, Agent, or Firm—Sommer & Sommer

[57] ABSTRACT

Apparatus is provided for sensing the actual position of an armature in an electromagnetic driver, such as a torque motor, a solenoid, or the like. An oscillator generates a relatively high frequency carrier signal, which is superimposed on a relatively low frequency command signal supplied to a drive coil. Detector coils are positioned in a magnetic circuit, and are arranged to have induced therein, signals identical in frequency to the superimposed signals. The amplitude of the induced signals varies with armature position. The high frequency induced signal is separated and demodulated to provide an output signal indicating the actual position of the armature.

7 Claims, 12 Drawing Figures

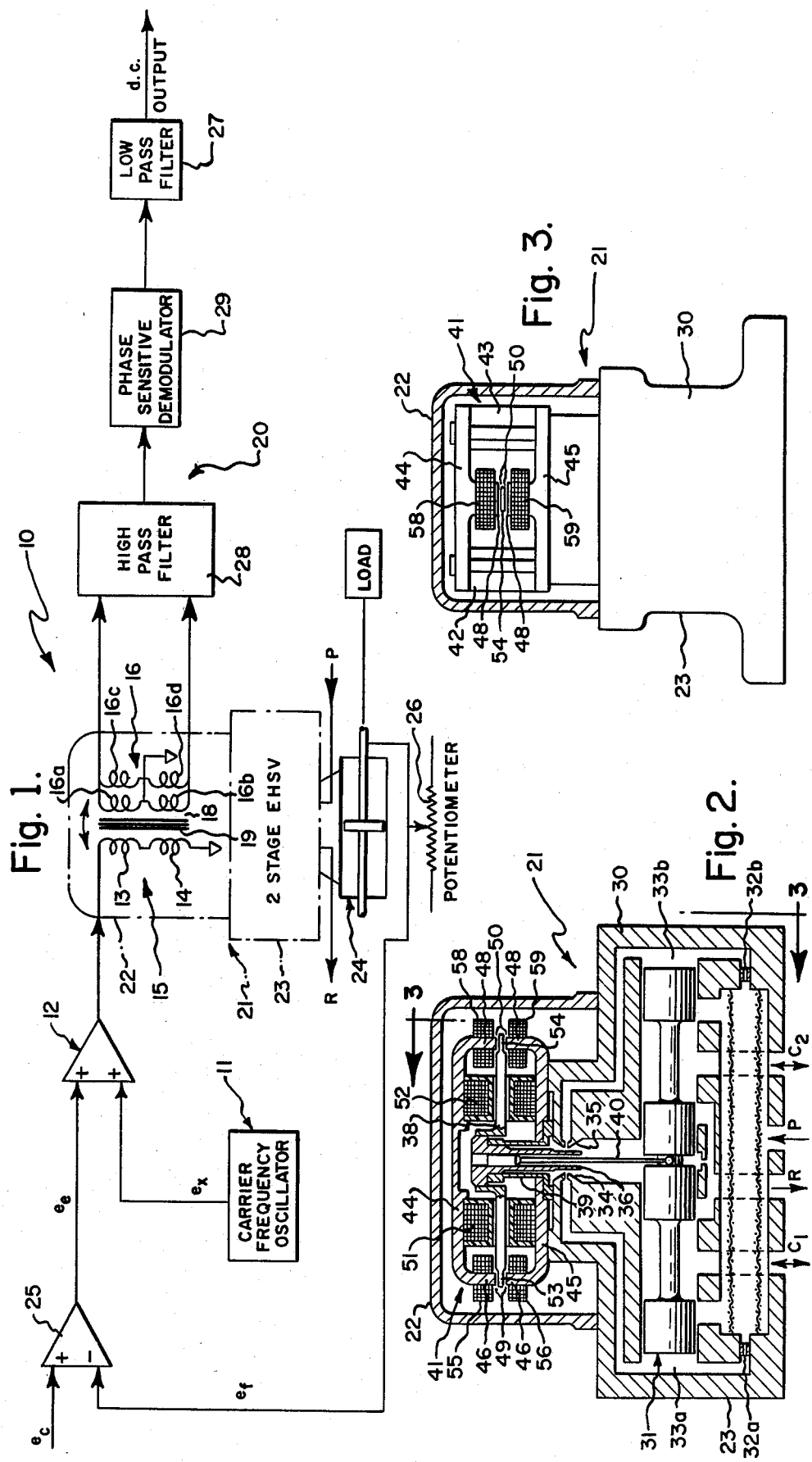

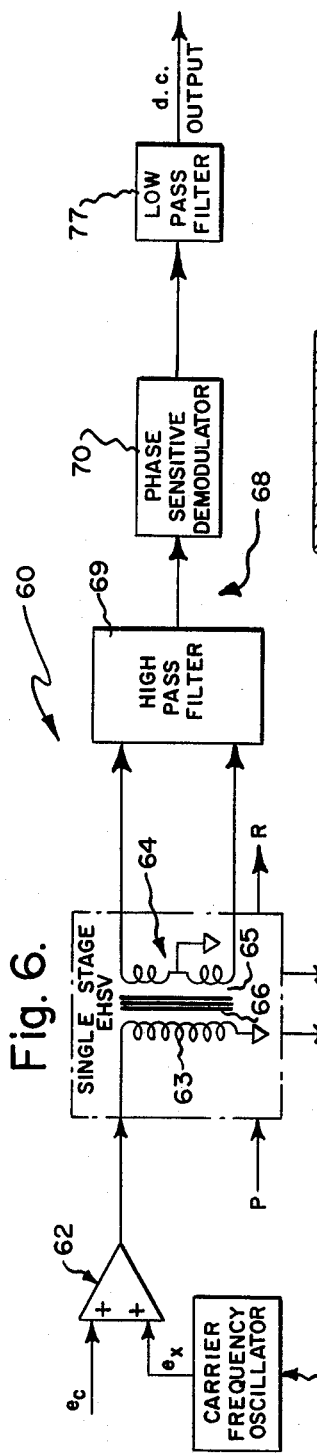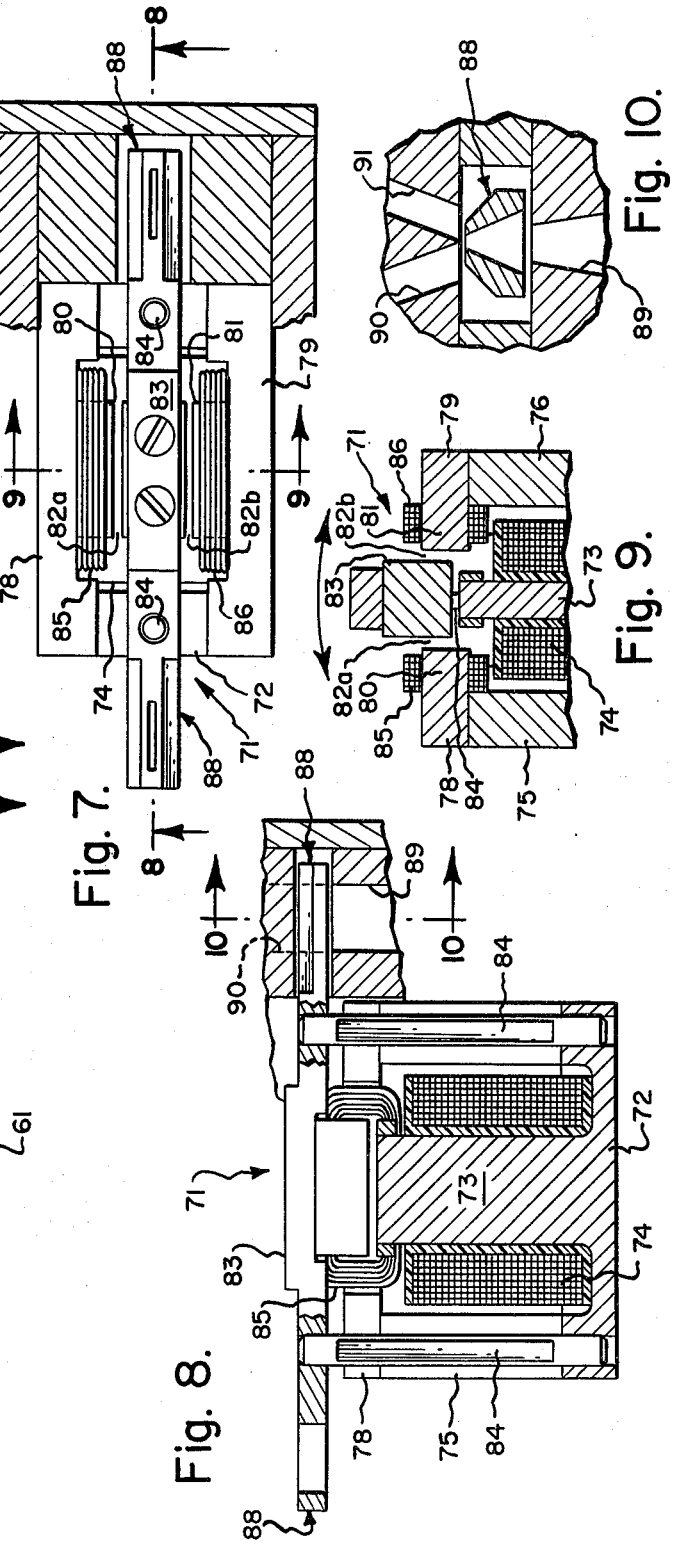

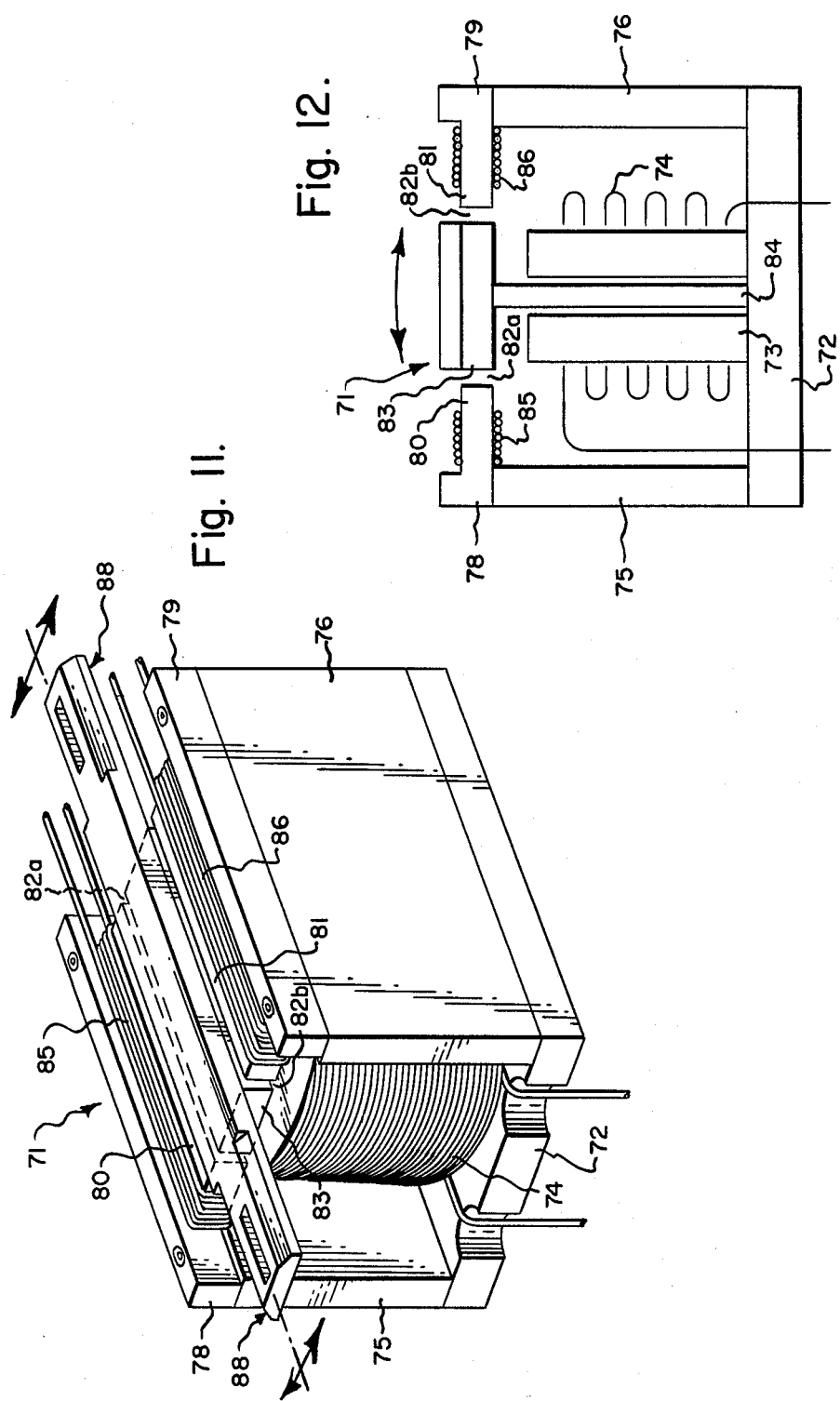

ARMATURE POSITION DETECTOR

BACKGROUND OF THE INVENTION

1. Field of the Invention

The present invention relates generally to the field of electromagnetic drivers, such as torque motors, solenoids and the like, and more particularly to improved apparatus for sensing the actual position of an armature in such an electromagnetic driver.

2. Description of the Prior Art

Torque motors and solenoids are perhaps the best known types of electromagnetic drivers.

Torque motors are commonly used in electrohydraulic servovalves to transduce an electrical input signal into a torque, which is used to control the flow of hydraulic fluid. Such torque motors generally include a permanent magnet, a polepiece, a coil, and an armature. While these components may be differently arranged, it is generally contemplated that the coil-induced flux interacts with the permanent magnet flux to produce a variable torque or force on the armature.

Another type of electromagnetic actuator is the solenoid, which generally includes a coil, an armature, and a magnetic circuit including an air gap. Current supplied to the coil induces a flux in the air gap, which in turn produces a force on the armature.

It is sometimes desired to determine the actual position of an armature in such electromagnetic drivers. For example, it may be desirable to verify the operation of a valve's electrical section prior to pressurization of its hydraulic section. Or, it may be desired to monitor armature position during normal operation to provide instrumentation data, for determining the fidelity of operation, or for fault monitoring in a redundant control system. In some applications, it may be desirable to determine armature position for use as a feedback signal to improve driver performance. In each case, it would be desirable to obtain such information concerning the actual position of the armature, without adversely affecting normal operation of the driver. Hence, it is important that such a position detector add negligible mass, inertia, or friction to the movable armature.

To date, several approaches have been proposed for sensing the position of an armature in a torque motor. These include: (1) attaching strain gages to the armature flexure support; (2) attaching the core of a linear variable differential transformer (LVDT) or a direct current differential transformer (DCDT) directly to the armature; (3) attaching one plate of a capacitance transducer to the armature; and (4) detecting reflected light from an incident light beam directed at the armature. Strain gages have not proved to be practical because of their frangibility. The second and third approaches add objectionable mass to the armature. The fourth approach does not add mass or friction, but requires additional space and weight for the light source and the beam detectors.

Specific examples of torque motors, used in electrohydraulic servovalves, are representatively shown in U.S. Pat. Nos. 2,625,136, 2,767,689, 3,023,782, 3,455,330, and 3,542,051. Use of torque motors in propellant control valves, is representatively shown in U.S. Pat. Nos. 3,373,769 and 3,884,267.

SUMMARY OF THE INVENTION

The present invention provides a unique improvement for use with an electromagnetic driver having a drive coil arranged to be supplied with a relatively low frequency drive signal and adapted to produce a magnetic field in response to the drive signal, having an air gap, and having an armature arranged in the air gap and arranged to be moved by the magnetic field.

The improvement provides sensing means for sensing the position of the armature. The sensing means broadly includes: an oscillator for generating a relatively high frequency carrier signal; summing means for superimposing the carrier signal on the drive signal and for supplying such superimposed signals to the drive coil; detecting means arranged to sense the flux in the air gap and operative to have induced therein, signals similar in frequency to the drive and carrier signals, and having amplitudes reflective of the position of the armature; and separation means operatively arranged to separate the high frequency induced signal from the low frequency induced signal; whereby the amplitude of the separated high frequency induced signal may indicate the actual position of the armature.

Accordingly, the general object of the invention is to provide sensing means for sensing the actual position of the armature in an electromagnetic driver.

Another object is to provide such sensing means in a manner that does not add mass to the armature.

Another object is to provide such sensing means which may monitor armature position during normal operation of the electromagnetic driver.

These and other objects and advantages will become apparent from the foregoing and ongoing specification, the drawings, and the appended claims.

BRIEF DESCRIPTION OF THE DRAWINGS

FIG. 1 is a block diagram showing the improved sensing means in association with a two-stage electrohydraulic servovalve having a two-sided torque motor.

FIG. 2 is a vertical sectional view of the servovalve shown in FIG. 1, this view particularly showing the position of the detector coils proximate the air gaps.

FIG. 3 is a transverse vertical sectional view of the servovalve, taken generally on line 3—3 of FIG. 2.

FIG. 6 is a block diagram showing the improved sensing means in association with a single-stage electrohydraulic servovalve having a one-sided torque motor.

FIG. 7 is a top plan view of the torque motor indicated in FIG. 6.

FIG. 8 is a longitudinal vertical sectional view of the torque motor, taken generally on line 8—8 of FIG. 7.

FIG. 9 is a transverse vertical sectional view of the torque motor, taken generally on line 9—9 of FIG. 7.

FIG. 10 is a transverse vertical sectional view of the single stage servovalve, taken generally on line 10—10 of FIG. 8, and principally showing the flow deflector.

FIG. 11 is a perspective view of the one-sided torque motor.

FIG. 12 is a schematic view of the one-sided torque motor.

DESCRIPTION OF THE PREFERRED EMBODIMENTS

Figure 5:
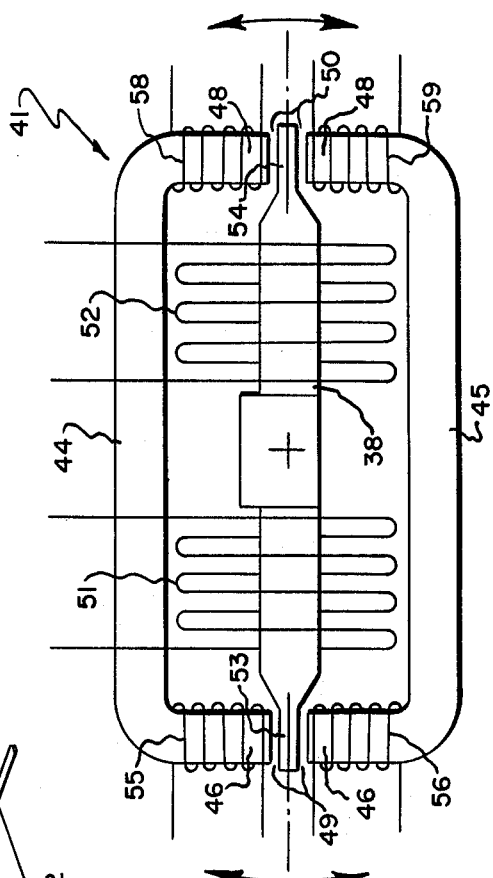
FIG. 5 is a schematic view of the two-sided torque motor.

At the outset, it should be clearly understood that like reference numerals are intended to identify the same elements and/or structure consistently throughout the several drawing figures, as such elements and/or structure may be further described or explained by the entire written specification, of which this detailed description is an integral part.

Referring now to the several drawing figures, and more particularly to FIG. 1 thereof, the invention broadly provides improved sensing means, of which one presently preferred embodiment is generally indicated at 10, for sensing the actual position of an armature in an electromagnetic driver. As used herein, the term "electromagnetic driver" is broadly intended to mean a mechanism in which an armature is moved in response to a magnetic field. Many different species of torque motors, solenoids, and the like, fall within the generic meaning of the term "electromagnetic driver." Such electromagnetic drivers are commonly used as prime movers to generate a force or torque, which is used for some purpose. Specific examples of such uses of torque motors and propellant control valves, are representatively shown and described in U.S. Pat. Nos. 2,625,136, 2,767,689, 3,023,782, 3,455,330, 3,542,051, 3,373,769, and 3,884,267; the aggregate disclosures of which are hereby incorporated by reference.

In FIG. 1, the improved sensing means 10 is shown as broadly including: an oscillator 11 operatively arranged to generate a relatively high frequency carrier signal; summing means 12 operatively arranged to superimpose the carrier signal $e_x$ upon a relatively low frequency drive signal $e_e$, and to supply such superimposed signals to the drive coils 13, 14 of an electromagnetic driver 15; detecting means 16 operatively arranged to sense the flux in an air gap 18, and operative to have induced therein signals similar in frequency to the carrier and drive signals but having amplitudes reflecting the actual position of an armature 19 interposed in the air gap between the drive coils and the detecting means; and separation means 20 operatively arranged to separate such high frequency induced carrier signal from such low frequency induced drive signal. The separated high frequency induced signal may be used to indicate the actual position of the armature relative to the detecting means.

The electromagnetic driver shown in FIG. 1 is a torque motor of a two-stage "nozzle and flapper"-type electohydraulic servovalve, generally indicated at 21, which has an electrical section 22 and a hydraulic section 23. This type of servovalve is more fully shown and described in the aforesaid U.S. Pat. No. 3,023,782. The output of the servovalve hydraulic section is supplied to a piston-and-cylinder actuator 24, which in turn is used to move a load.

More particularly, a relatively low frequency d.c. command signal $e_c$ is supplied to an amplifier 25, which also receives a negative feedback signal $e_f$ from a position transducer, such as potentiometer 26, connected to the rod of the hydraulic actuator. The command input signal $e_c$ indicates the desired position of the actuator rod, and the negative feedback signal $e_f$ indicates its actual position. Amplifier 25 supplies the difference between the command and feedback signals, as an error or drive signal $e_e$ to the summing means 12, which may be a summing amplifier. The relatively high frequency a.c. carrier signal generated by oscillator 11 is also supplied to summing amplifier 12, which superimposes the error and carrier signals and supplies such superimposed signals to the series-connected drive coils 13, 14 of the torque motor. The command signal $e_c$ is a variable d.c. signal, and typically has a relatively low frequency on the order of 0–200 Hz. The oscillator 11 generates a relatively high frequency a.c. signal, typically on the order of a decade or more higher than the frequency of the command signal. Hence, if the frequency of the command signal is on the order 0–200 Hz, then the carrier signal frequency may typically be from 2 KHz to 20 KHz. Because the carrier frequency exceeds the valve's frequency response capability, the servovalve will not respond to the signal generated by oscillator 11.

The detecting means 16 are shown as including four coils 16a, 16b, 16c and 16d, arranged in two separate series-bucking pairs. Hence, detector coils 16a and 16b form a first cooperative pair, and detector coils 16c and 16d form a second cooperative pair. The coils of each cooperative pair are arranged proximate the air gap 18 to sense the position of the armature. The superimposed error and carrier signals supplied to the torque motor's drive coils 13, 14, will induce signals of similar frequency in the detector coils. However, the position of armature 19 will modify the amplitude of such induced signals.

The separation means 20 is shown as including a high pass filter 28, a phase sensitive demodulator 29, and a low pass filter 27. The signals induced in the detector coils are supplied to filter 28, which screens out the relatively low frequency induced drive signal, but allows the relatively high frequency induced signal to pass. The induced high frequency signal is then supplied to phase sensitive demodulator and low pass filter, which in turn produces a d.c. output signal indicating armature position by magnitude and polarity. Inasmuch as the detector coils function similarly to the secondary coils of a linear variable differential transformer (LVDT), the d.c. output signal supplied by the phase sensitive demodulator will vary linearly with armature position.

Hence, in the improved sensing means 10, a carrier signal, having a relatively high frequency exceeding the dynamic response capability of the electromagnetic driver, is superimposed on the lower frequency normal drive signal supplied to the drive coils. The drive signal produces a flux in the air gap which causes the armature to move relative to the fixed torque motor structure. Combined signals, identical in frequency to the superimposed signals, are induced in the detector coils. The amplitude of the induced signals reflects the armature position within the air gap. The high frequency induced signal is separated from the low frequency induced signal, and then converted into a d.c. output, which varies essentially proportional to armature position. Thus, the magnitude and polarity of the d.c. output signal indicates the actual position of the armature. One unique aspect of the improved sensing means is that it is possible to continually monitor the actual position of the armature as the armature moves in response to the drive signal during normal operation of the driver.

Figure 4:
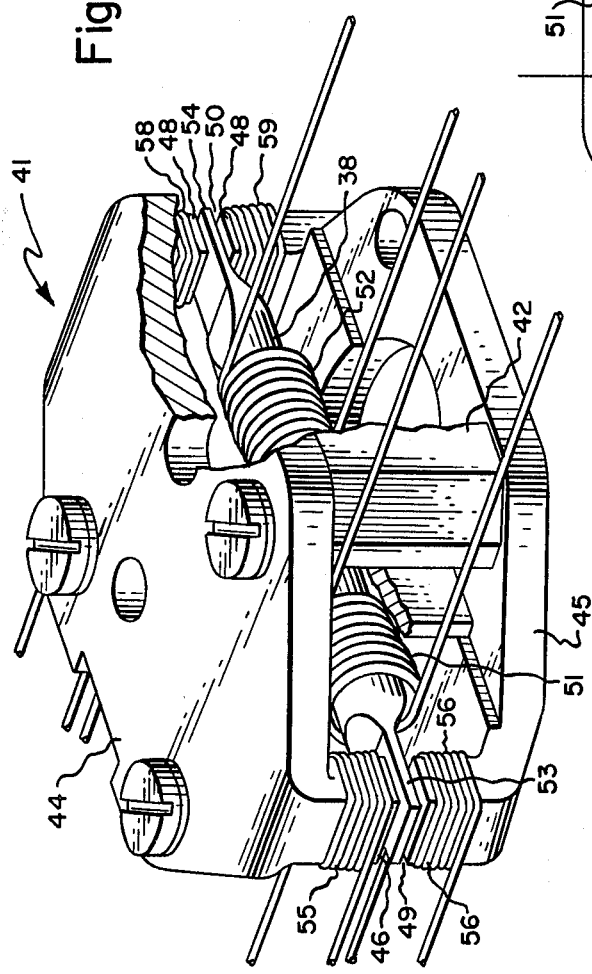
FIG. 4 is a perspective view of the two-sided torque motor, with portions thereof broken away to more clearly illustrate the armature.

The physical structure of the servovalve schematically illustrated in FIG. 1, is more fully shown in FIGS. 2–5. Inasmuch as this servovalve is more fully described in the aforesaid U.S. Pat. No. 3,023,782, save for the provision of the detector coils, the ensuing description of same will be somewhat abbreviated.

Referring now to FIGS. 2 and 3, servovalve 21 is shown as having a body 30 provided with a cylindrical chamber in which a four-lobed valve spool 31 is slidably mounted. The bottom of body 30 is provided with four ports: one being a pressure port P; another being a return port R; and the remaining two being a pair of cooperative control ports $C_1$ and $C_2$, which may be used to control the flow of fluid to hydraulic actuator 24. Hydraulic fluid supplied to the valve through pressure port P is applied through orifices 32a, 32b to left and right spool end chambers 33a, 33b, and is discharged through left and right nozzles 34, 35 against opposite sides of a flapper 36. This flapper is a rigid tubular member and has an armature 38 mounted on its upper end. The hydraulic section of this valve is isolated from its electrical section by a flexure tube member 39, upon the upper end of which the armature-flapper member is mounted. A spring wire 40 provides mechanical feedback between the valve spool and the armature flapper member.

Referring now to FIGS. 2-5, the torque motor, generally indicated at 41, is shown as including a pair of front and rear horizontally-spaced permanent magnets 42, 43 (FIG. 3) operatively interposed between a pair of vertically-spaced upper and lower pole plates 44, 45. The corresponding ends of the pole plates are bent toward one another to form spaced and opposing polepieces, those on the left side being severally indicated at 46 and those on the right side being severally indicated at 48. These left and right polepieces 46, 46 and 38, 38 define left and right air gaps 49 and 50, respectively, therebetween. Left and right drive coils 51, 52 surround the armature 38 and are arranged between the pole plates on opposite sides of the flapper. As schematically indicated in FIG. 1, these two drive coils may be arranged in series with one another. The armature 38 is shown as having left and right marginal plate portions 53, 54 arranged in left and right air gaps 49, 50 respectively. Hence, a suitable electrical drive signal may be supplied to the drive coils to create a magnetic field in the air gaps, thereby to selectively cause the armature to move in either a clockwise or counterclockwise direction. Such pivotal movement of the armature causes the flapper to move closer to one nozzle and farther away from the other, thereby producing a pressure differential in the valve spool end chambers and shifting the valve spool in the appropriate direction to establish flow through valve control ports $C_1$ and $C_2$. A more complete description of the structure and operation of this servovalve may be found in the aforesaid U.S. Pat. No. 3,023,782.

The torque motor 41 shown in FIGS. 2-5 has been modified slightly from that shown in U.S. Pat. No. 3,023,782, to allow for the provision of four detector coils 55, 56, 58 and 59, which are arranged about the polepieces proximate the air gaps. Specifically, a first cooperative pair of detector coils 55, 56 encircle the left polepieces, respectively, so as to be arranged to sense the flux in the left air gaps 49. Similarly, the second cooperative pair of coils 58, 59 encircle the upper and lower right polepieces, so as to be arranged to sense the flux in the right air gaps 50. The coils of each cooperative pair are arranged to be series-bucking so that as the associated armature plate portion moves closer to one polepiece, the signal induced in the proximate coil will be favored at the expense of its cooperative mate. Thus, each cooperative pair of detector coils functions in a manner akin to the secondary coils of a linear variable differential transformer. It should also be noted that if the armature were mounted for movement about a perfect "dead center" axis, its plate portions 53, 54 would be ideally spaced equally from diametrically opposite polepieces. However, the pivotal movement of the armature is accommodated by flexure or bending of flexure tube member 39. Hence, the effective axis for such armature pivotal movement does not coincide with an ideal "dead center" location. By using two cooperative pairs of detector coils, the position of the armature left and right plate portions relative to the associated polepieces, can be determined. However, while it is presently preferred to use two cooperative pairs of detector coils in the torque motor shown in FIG. 1, one of these pairs might be omitted, if desired.

Use of the improved sensing means in association with a "jet and jet deflector"-type of servovalve, is shown in FIGS. 6-12. This servovalve is regarded as being a "single-stage" type, because there is just one hydraulic amplifier (i.e., the jet deflector) rather than two, as is provided by the nozzles/flapper and spool of the servovalve shown in FIG. 1. The "jet and jet deflector"-type of servovalve is more fully shown and described in the aforesaid U.S. Pat. No. 3,542,051. Whereas the improved sensing means was associated with a "two-sided torque motor" in FIGS. 1-5, a "one-sided torque motor" is illustrated in the valve shown in FIGS. 6-12.

Referring now to FIG. 6, a second preferred embodiment of the improved sensing means, generally indicated at 60, is shown as again including: an oscillator 61 for generating a relatively high frequency carrier signal; summing means 62 arranged to superimpose the carrier signal $e_x$ on a valve command or drive signal $e_c$ and to supply such superimposed signals to the torque motor drive coil 63; detecting means, generally indicated at 64, arranged to sense the flux in air gap 65 and operative to have induced therein, signals similar in frequency to the superimposed drive and carrier signals, but having amplitudes reflective of the position of an armature 66. The signals induced in the detector means are again supplied to separation means 68, which includes a high pass filter 69, a phase sensitive demodulator 70, and a low pass filter 77. As with the first embodiment, the output of the phase sensitive demodulator and low pass filter is a d.c. signal, the magnitude and polarity of which indicate the actual position of the armature with respect to the detecting means.

The "one-sided torque motor" is generally indicated at 71 in FIGS. 7-12. Torque motor 71 includes a base 72 provided with a central core 73 upstanding therefrom, a drive coil 74 wrapped around the core, left and right permanent magnets 75, 76 mounted on the base, left and right pole plates 78, 79 mounted on the magnets and having their inwardly-facing end faces arranged to form spaced and facing left and right polepieces 80, 81. The spacing between polepieces 80, 81 and armature 83 constitutes air gaps 82a, 82b. The armature 83 is supported in this position by two flexure tube members 84, 84, which allow the elongated armature to move back and forth toward the proximate polepiece (FIG. 9) in response to a magnetic field produced by drive coil 74. A cooperative pair of left and right detector coils 85, 86 are wrapped around the polepieces 80, 81, respectively. As best shown in FIGS. 7 and 10, one or more ends of the armature may be provided with a deflector 88 which may move with the armature to deflect and proportionally divide a fluid jet supplied by a pressurized nozzle 89 between two receiver passages 90, 91 to establish the desired flow through the servovalve. As with the first embodiment, detector coils 85, 86 are arranged to be series-bucking, and function in a manner akin to the secondary coils of a linear variable differential transformer. While the signals induced in the detector coils will have a frequencies identical to the superimposed drive and carrier signals supplied to the drive coil, the amplitude and polarity of such induced signals reflect the position of the armature relative to the polepieces.

Persons skilled in this art will recognize that various changes and modifications may be made without departing from the spirit of the invention. For example, the improved sensing means may be associated with other types of torque motors, a wide variety of solenoids, and other electromagnetic actuators and drivers. Whether one or more cooperative pairs of series-bucking detector coils are used, is considered to be a matter of design choice depending upon the nature of armature motion, the symmetry and construction of the electromagnetic driver, and the desired level of induced signal. Similarly, the specific design and placement of such detector coils is regarded as falling within the ambit of one skilled in this art. In the improved sensing means, the drive coil performs two functions: first, to create a magnetic field sufficient to move the armature as desired, and, secondly to induce signals in the detector coils. It is also deemed preferable that the frequency of the carrier signal be so in excess of the frequency response capability of the servovalve or the electromechanical driver, as to have a negigible, if any, effect on valve or driver response. While it is suggested that such carrier frequency be on the order of ten or more times the maximum frequency of the command signal to the driver, the specific frequency relationship between the carrier and drive signals may be readily varied by one skilled in this art.

Therefore, while two preferred embodiments of the improved sensing means have been shown and described, and several modifications thereof discussed, persons skilled in this art will readily appreciate that various additional changes and modifications may be made without departing from the spirit of the invention, which is defined by the following claims.

What is claimed is:

1. In a valve including an electromagnetic driver having a drive coil arranged to be supplied with a relatively low frequency drive signal and adapted to produce a magnetic field in response to said drive signal, having an air gap, and having an armature with a portion thereof arranged in said air gap and adapted to be moved by said magnetic field, the improvement which comprises: sensing means for sensing the position of said armature, said sensing means including
   an oscillator for generating a relatively high frequency carrier signal exceeding the dynamic response capability of said valve;
   summing means for superimposing said carrier and drive signals and for supplying such superimposed signals to said drive coil;
   detecting means arranged to sense the flux in said air gap and operative to have induced therein signals similar in frequency to said drive and carrier signals but having amplitudes reflective of the position of said armature; and
   separation means operatively arranged to separate such high frequency induced signal from such low frequency induced signal;
   whereby the amplitude of such separated high frequency induced signal may reflect the position of said armature.
2. The improvement as set forth in claim 1 wherein said detecting means includes two detector coils.
3. The improvement as set forth in claim 2 wherein said detector coils are arranged to be series-bucking.
4. The improvement as set forth in claim 1 wherein said summing means is a summing amplifier.
5. The improvement as set forth in claim 1 wherein said separation means includes a high pass filter and a demodulator.
6. The improvement as set forth in claim 5 wherein said high pass filter is frequency sensitive, and said demodulator is phase sensitive.
7. The improvement as set forth in claim 1 wherein said driver is a torque motor.

* * * * *